(12) United States Patent
Jansen et al.

(10) Patent No.: US 9,975,415 B2
(45) Date of Patent: May 22, 2018

(54) COOLING ARRANGEMENT FOR A MOTOR OF A VEHICLE

(71) Applicant: General Electric Company, Schenectady, NY (US)

(72) Inventors: Patrick Lee Jansen, Scotia, NY (US); Gregory Benton Badders, Erie, PA (US); Paul Deahl, Perterstown, WV (US)

(73) Assignee: General Electric Company, Schenectady, NY (US)

( * ) Notice: Subject to any disclaimer, the term of this patent is extended or adjusted under 35 U.S.C. 154(b) by 0 days. days.

(21) Appl. No.: 15/044,134

(22) Filed: Feb. 16, 2016

(65) Prior Publication Data
US 2017/0232828 A1    Aug. 17, 2017

(51) Int. Cl.
*B60K 1/00*      (2006.01)
*B60K 11/02*     (2006.01)
*B60K 1/04*      (2006.01)
*B60K 17/04*     (2006.01)

(52) U.S. Cl.
CPC ............... *B60K 1/00* (2013.01); *B60K 1/04* (2013.01); *B60K 11/02* (2013.01); *B60K 17/04* (2013.01); *B60K 2001/001* (2013.01); *B60K 2001/003* (2013.01); *B60K 2001/0416* (2013.01)

(58) Field of Classification Search
CPC . B60K 1/00; B60K 1/04; B60K 11/02; B60K 17/04; B60K 17/356; B60K 2001/001; B60K 2001/003; B60K 2001/0416; E02F 9/0841; E02F 9/0858

USPC .............................................. 180/65.6, 242
See application file for complete search history.

(56) References Cited

U.S. PATENT DOCUMENTS

| | | | | |
|---|---|---|---|---|
| 1,700,840 A | * | 2/1929 | Gay | F28D 15/0208 165/104.21 |
| 2,898,542 A | * | 8/1959 | Cholick | F02B 63/04 322/1 |
| 3,336,997 A | * | 8/1967 | Yates | B60K 1/02 180/65.1 |
| 3,554,311 A | * | 1/1971 | Thompson | B62M 7/00 180/220 |
| 4,199,037 A | * | 4/1980 | White | B60K 3/04 180/65.245 |
| 4,348,604 A | * | 9/1982 | Thode | H02K 9/18 165/166 |
| 4,397,365 A | * | 8/1983 | Harbe | B60K 1/04 104/34 |
| 4,475,618 A | * | 10/1984 | Kennedy | B62K 9/00 180/237 |
| 4,484,649 A | * | 11/1984 | Kennedy | B62K 9/00 180/206.5 |
| 4,540,888 A | * | 9/1985 | Drewry | B60P 3/32 290/1 R |
| D281,428 S | * | 11/1985 | Kent | D15/21 |

(Continued)

*Primary Examiner* — Hau V Phan
*Assistant Examiner* — Brian L Cassidy
(74) *Attorney, Agent, or Firm* — GE Global Patent Operation; John A. Kramer (57) ABSTRACT

Various methods and systems are provided for an electric motor arrangement in a chassis of a battery electric vehicle. In one embodiment, a front chassis for a battery electric vehicle comprises a structural frame including two parallel sidewalls and a first portion of a vehicle articulation joint and an electric motor coupled between and in face-sharing contact with each of the two parallel sidewalls.

19 Claims, 9 Drawing Sheets

(56) References Cited

U.S. PATENT DOCUMENTS

| | | | | |
|---|---|---|---|---|
| 4,754,179 A * | 6/1988 | Capuano | H02K 5/1672 | 174/50 |
| 4,807,354 A * | 2/1989 | Capuano | H02K 5/1672 | 29/401.1 |
| 5,016,720 A * | 5/1991 | Coker | A61G 5/047 | 180/13 |
| 5,573,078 A * | 11/1996 | Stringer | B60K 1/00 | 180/11 |
| 5,844,333 A * | 12/1998 | Sheerin | F28D 1/03 | 165/124 |
| 6,113,342 A * | 9/2000 | Smith | B60L 11/1822 | 180/68.5 |
| 6,246,134 B1 * | 6/2001 | Berrong | H02K 9/18 | 310/52 |
| 6,408,961 B1 * | 6/2002 | Chen | A61G 5/02 | 180/6.5 |
| 6,499,532 B1 * | 12/2002 | Williams | F28D 15/0266 | 165/104.14 |
| 6,619,416 B2 * | 9/2003 | Lan | B62K 3/002 | 180/181 |
| 6,725,955 B2 * | 4/2004 | Bidwell | B62K 27/003 | 180/11 |
| 7,053,568 B2 * | 5/2006 | Rudinec | B60L 11/1803 | 180/243 |
| 7,108,027 B2 * | 9/2006 | Horii | B60K 1/00 | 141/286 |
| 7,712,558 B2 * | 5/2010 | Helson | B62B 5/0079 | 180/19.1 |
| 7,777,374 B2 * | 8/2010 | Ressel | H02K 9/18 | 310/52 |
| 8,261,859 B2 * | 9/2012 | Duehring | B62M 7/14 | 180/11 |
| 8,292,015 B2 * | 10/2012 | O'Quinn | B60K 1/04 | 180/68.5 |
| 8,581,456 B2 * | 11/2013 | Osterberg | H02K 9/12 | 310/57 |
| 8,970,074 B2 * | 3/2015 | Wagner | H02K 1/32 | 310/54 |
| 8,973,689 B2 * | 3/2015 | Plazotta | B60L 11/18 | 180/220 |
| 8,991,528 B2 * | 3/2015 | Hellholm | B60K 6/46 | 180/14.2 |
| 9,170,081 B2 * | 10/2015 | Rudinec | F42D 1/10 | |
| 9,358,895 B2 * | 6/2016 | Avganim | B60L 11/1822 | |
| 9,550,542 B2 * | 1/2017 | Figueroa | B62K 15/00 | |
| 2009/0255747 A1 * | 10/2009 | Kasaba | B62D 51/02 | 180/208 |
| 2010/0307846 A1 * | 12/2010 | Kvist | B60K 6/48 | 180/65.22 |
| 2014/0303864 A1 * | 10/2014 | Karlsson | B60K 23/04 | 701/69 |
| 2015/0071747 A1 * | 3/2015 | Deahl | E21F 13/025 | 414/469 |
| 2015/0176250 A1 | 6/2015 | Stutchbury | | |
| 2016/0347397 A1 * | 12/2016 | Etzelsberger | B62K 15/006 | |
| 2017/0030051 A1 * | 2/2017 | Melchiori | E02F 9/0841 | |

* cited by examiner

COOLING ARRANGEMENT FOR A MOTOR OF A VEHICLE

BACKGROUND

Technical Field

Embodiments of the subject matter disclosed herein relate to a cooling arrangement for a motor of a vehicle.

Discussion of Art

Heavy-duty vehicles for harsh and/or hazardous environments may include electric motors (e.g., electric traction motors) that require cooling. Such vehicles may include underground mining vehicles such as load-haul-dump vehicles, haul trucks, and ancillary vehicles such as coal scoops, drilling jumbos, or the like. In one example, these vehicles may be battery electric vehicles that are driven only by the electric traction motor and not by additional engines (e.g., diesel engines). In such vehicles, the electric motors may be required to be sealed. Thus, cooling of these electric motors is generally limited to passive approaches, such as natural convective non-ventilated cooling, and active approaches including fan-cooling, forced air over the motor frame via a blower, and various others incorporating an intermediate cooling medium and heat exchangers, such as liquid-cooling and air-to-air heat exchangers. However, with the exception of convective non-ventilated cooling, these cooling approaches may introduce maintenance requirements and/or failure modes, especially in underground mining environments (e.g., rock dust, moisture, or the like). While totally enclosed convective non-ventilated cooling (TENV) motors are beneficial for underground mining because they are sealed from the environment and have no moving parts, filters, or secondary cooling, they also tend to be larger and heavier than actively-cooled motors of the same torque and power ratings (due to requiring increased surface area for cooling and reduced loss densities). The large weight and size of TENV motors present design challenges on the vehicle, often resulting in a less capable vehicle or requiring additional cooling systems. In one example, adding cooling fins to an exterior of the motor frame may increase motor cooling. However, these fins increase the overall effective size of the motor, as well as increase the trapping of debris such as rock dust on the fins, thereby decreasing their cooling effectiveness.

BRIEF DESCRIPTION

In one embodiment, a front chassis for a battery electric vehicle comprises a structural frame including two parallel sidewalls and a vehicle articulation joint; and an electric motor coupled between and in face-sharing contact with each of the two parallel sidewalls. In this way, heat produced by the electric motor may be transferred away from the electric motor and to the sidewalls of the structural frame.

DETAILED DESCRIPTION

The following description relates to embodiments of a chassis for a battery electric vehicle. In one embodiment, the chassis may be one of a front or rear chassis and may include a structural frame including two parallel sidewalls and a portion of a vehicle articulation joint that pivotally couples the front and rear chassis to one another. The chassis further includes an electric motor coupled between and in face-sharing contact with each of the two parallel sidewalls. In one example, the battery electric vehicle may be an off-highway vehicle. In another example, the battery electric vehicle may be a heavy-duty vehicle used in harsh and/or hazardous environments. Some examples of such a heavy-duty vehicle may include underground mining vehicles such as load-haul-dump vehicles, haul trucks, and ancillary vehicles such as coal scoops, drilling jumbos, or the like. In the example of the load-haul-dump vehicle, multiple vehicle components, such as a bucket, wheel axles, and an articulation joint coupling the chassis to additional components or another chassis of the vehicle, may be coupled to the chassis. By positioning the electric motor between and in face-sharing contact with each of the two parallel sidewalls of the structural frame of the chassis, heat generated by the electric motor may be transferred from the electric motor to the sidewalls, thereby cooling the electric motor and increasing motor performance while also decreasing motor degradation.

Figure 1:
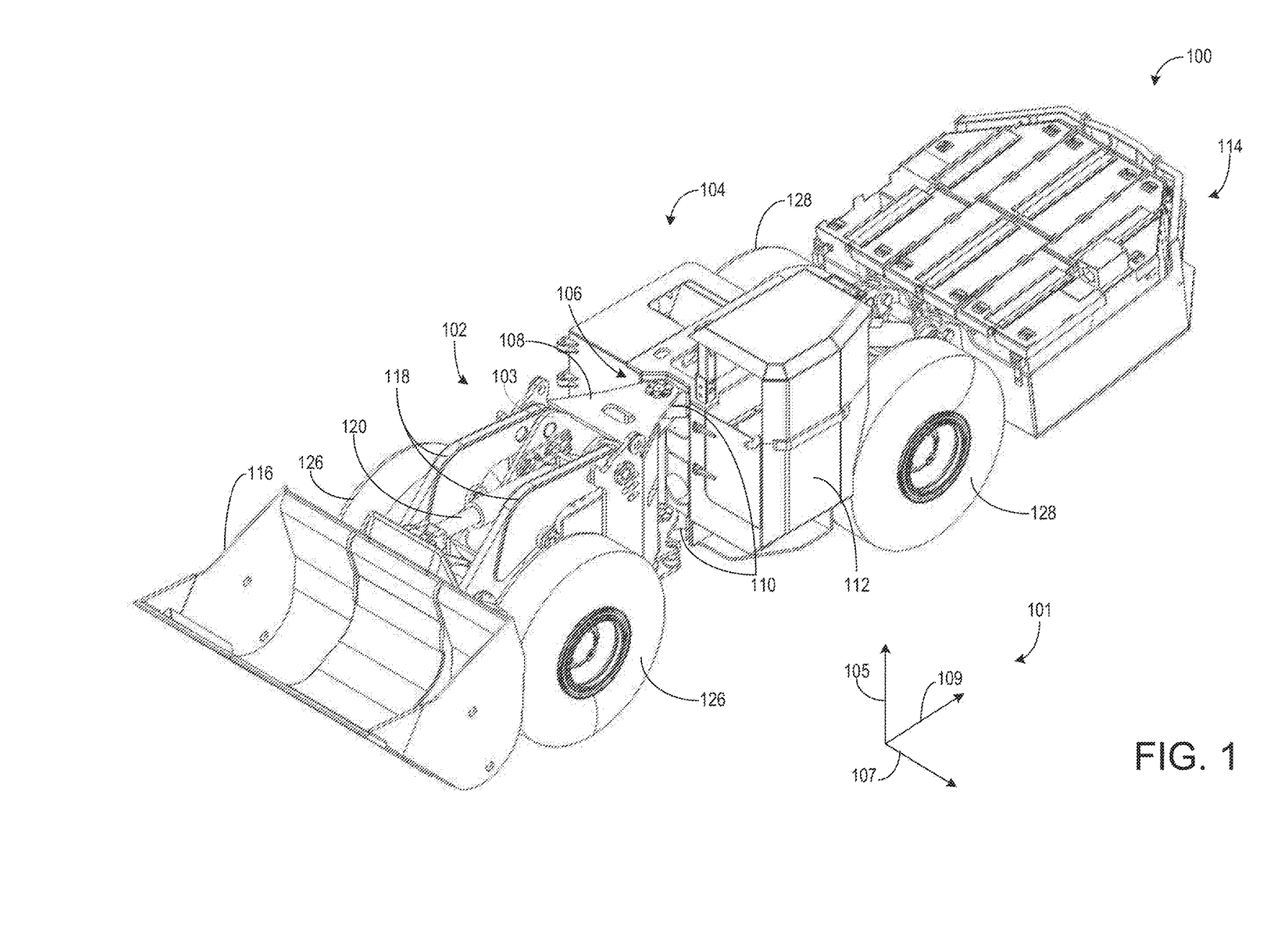
FIG. 1 shows a perspective view of a battery electric load-haul-dump vehicle according to an embodiment of the invention.
Figure 2:
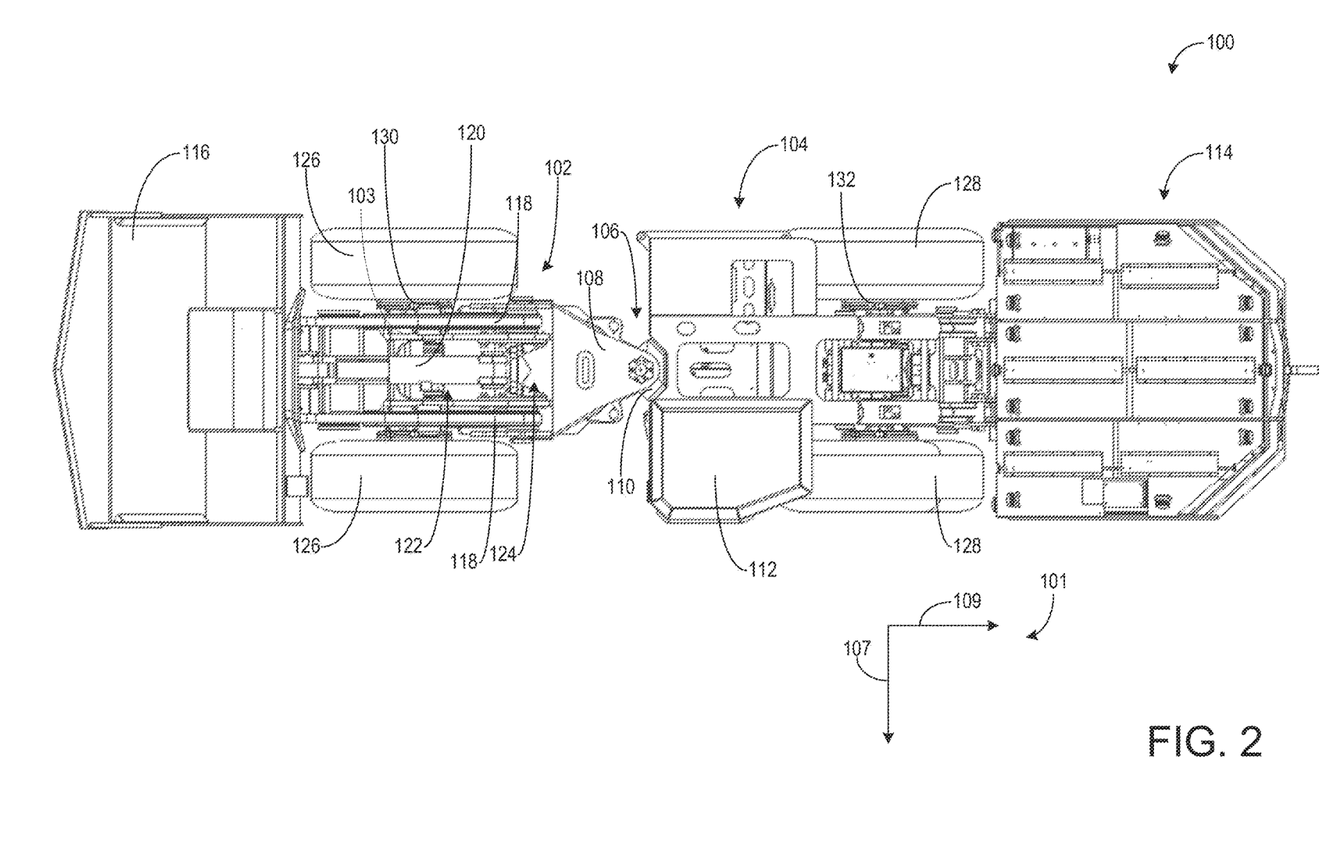
FIG. 2 shows a top view of the battery electric load-haul-dump vehicle according to an embodiment of the invention.
Figure 3:
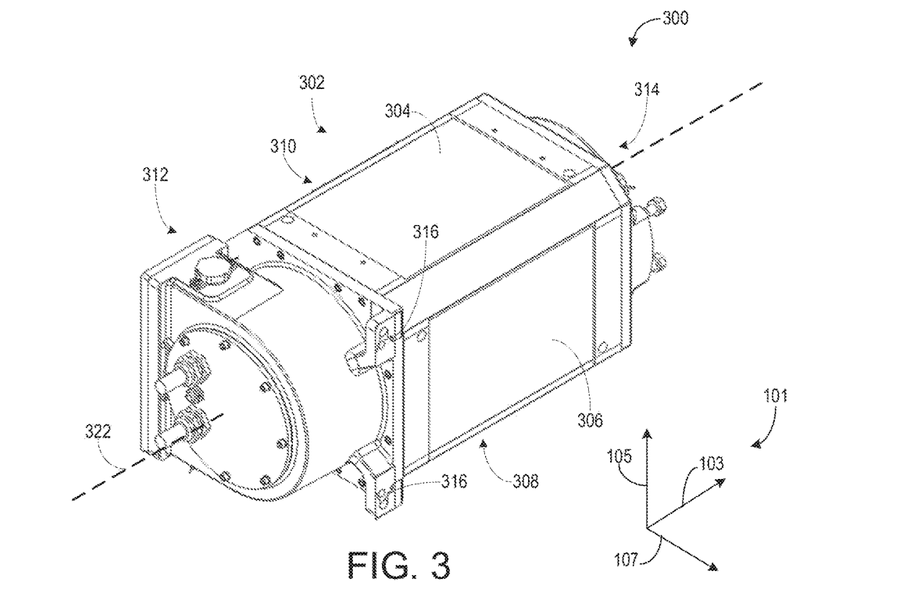
FIG. 3 shows a perspective view of an electric motor according to an embodiment of the invention.
Figure 4:
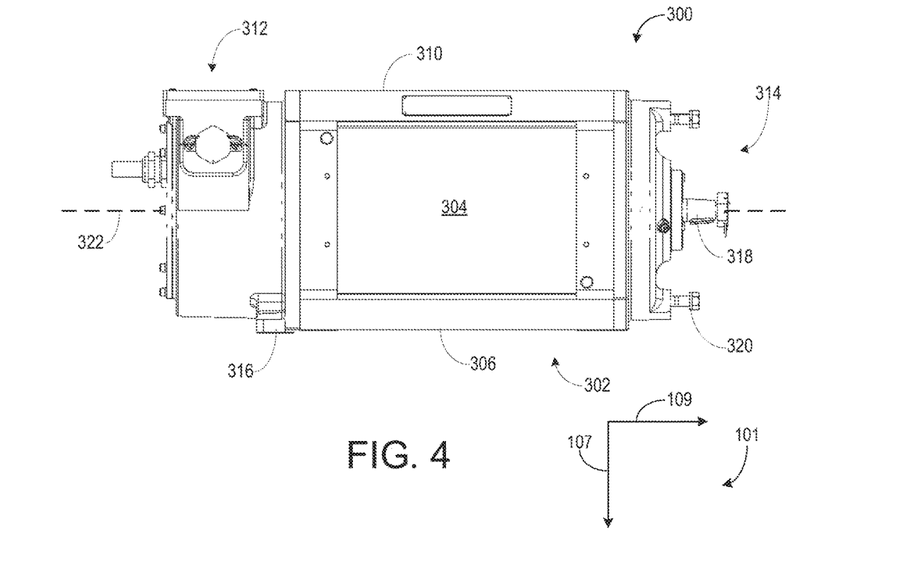
FIG. 4 shows a top view of the electric motor according to an embodiment of the invention.
Figure 10:
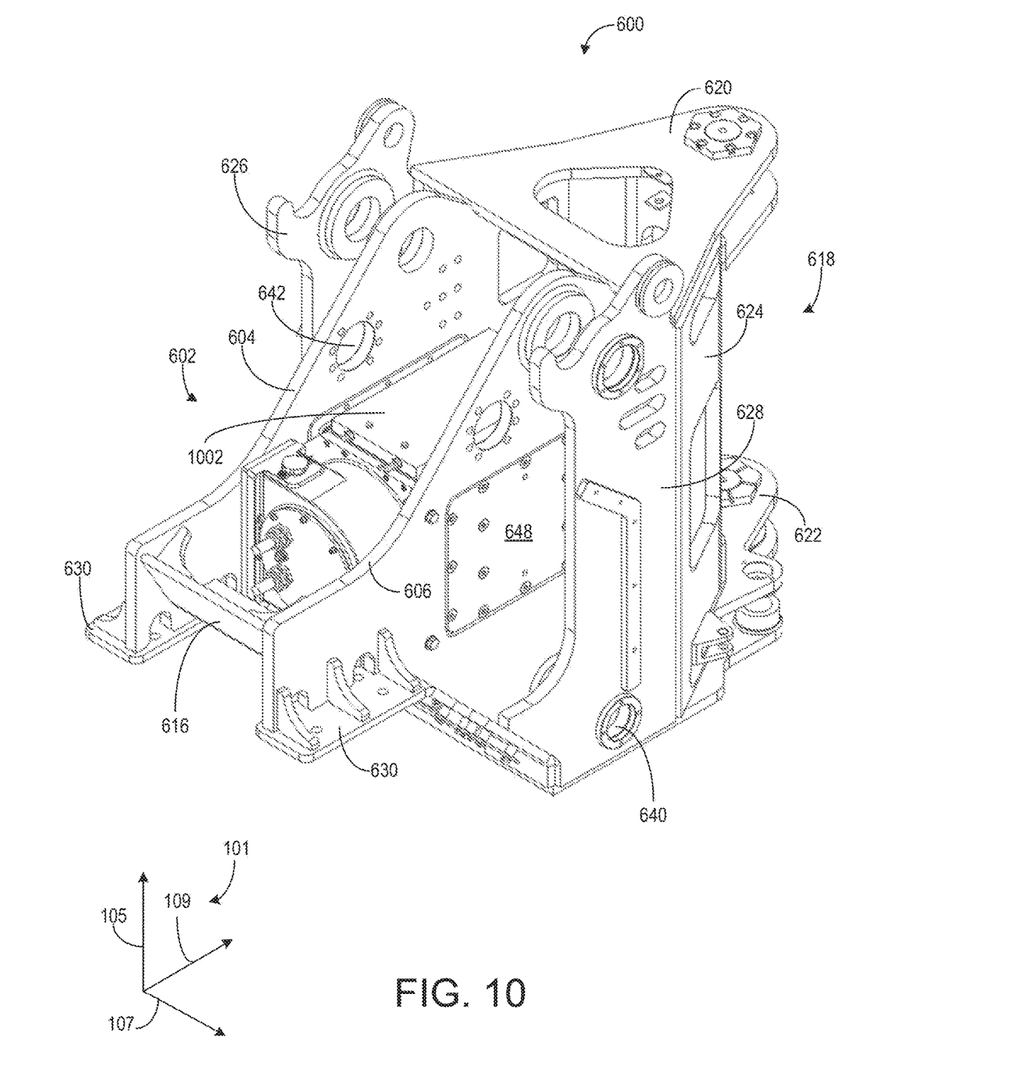
FIG. 10 shows an assembled view of the electric motor positioned within the structural frame of a chassis of a battery electric vehicle, where the structural frame includes window cut-outs covered by chassis plates, and a liquid-cooled chill plate coupled to the motor according to an embodiment of the invention.
Figure 11:
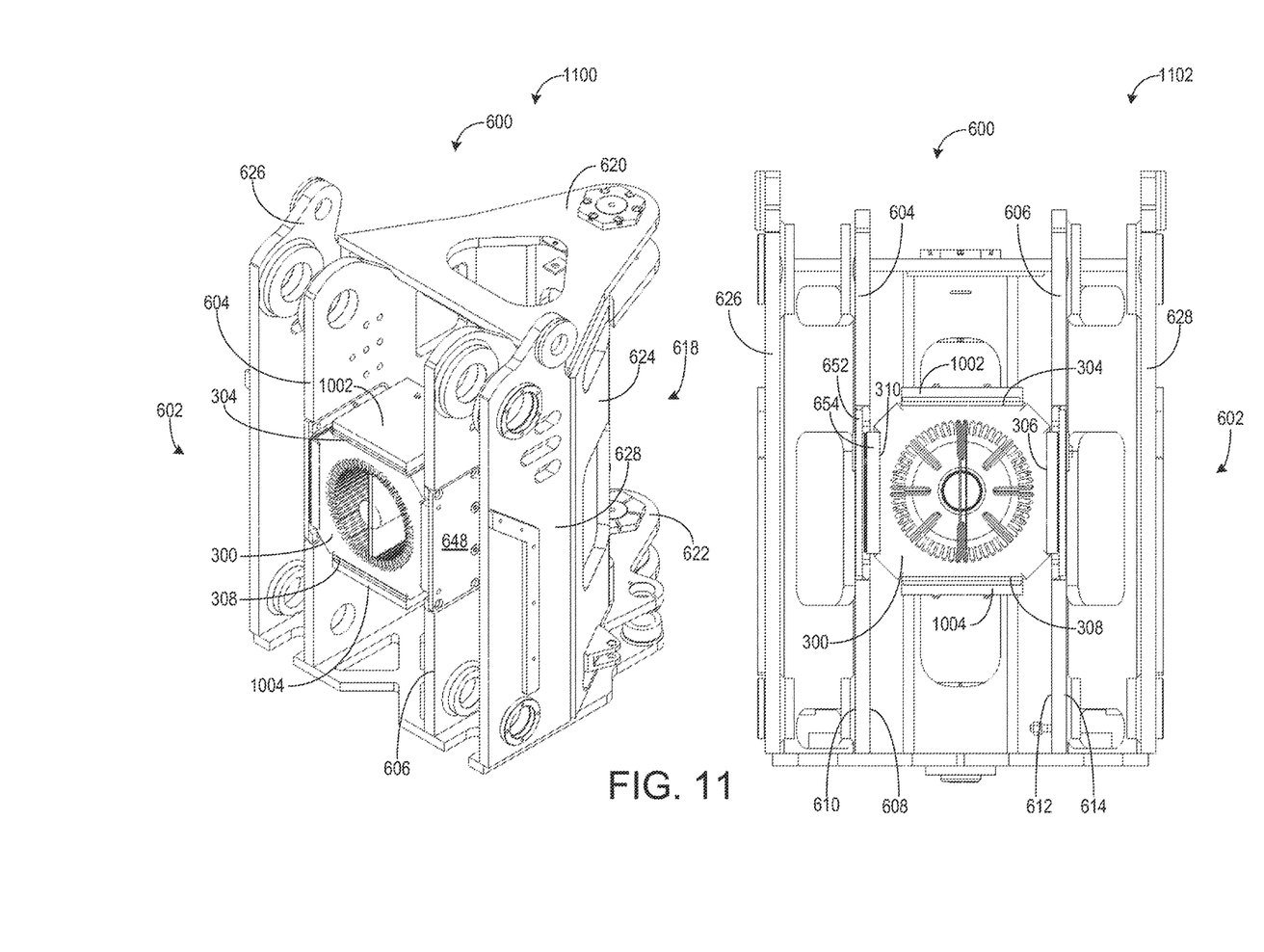
FIG. 11 shows a section view of the electric motor positioned within the structural frame of a chassis of a battery electric vehicle, where the structural frame includes window cut-outs covered by chassis plates, and a liquid-cooled chill plate coupled to the motor according to an embodiment of the invention.

FIGS. 1-2 show an embodiment of a battery electric vehicle including the chassis described above. Specifically, FIGS. 1-2 show an embodiment of a load-haul-dump vehicle including a work member (e.g., such as a bucket), electric traction motor, and battery tray. An example of the electric motor used to drive the load-haul-dump vehicle (or alternate battery electric vehicle) is shown in FIGS. 3-4. The electric motor is sandwiched between parallel sidewalls of the structural frame of the chassis, as shown in FIGS. 5-11, thereby putting the motor in direct thermal contact with the structural frame. In one example, in chassis may be a front chassis of the vehicle. In another example, the chassis may be a rear chassis of the vehicle. In this way, the electric motor may be arranged in either or both of the front and rear chassis of the vehicle. FIGS. 5-9 show various embodiments of the structural frame with the motor positioned within the structural frame. In some examples, the structural frame includes window cut-outs and plates that cover the windows to enable easy installation and removal of the motor to and from within the structural frame. In another example, as shown in FIGS. 10-11, a liquid-cooled chill plate may be positioned on one or more of the walls of the electric motor that are not contacting the sidewalls of the structural frame. In this way, increased cooling may be provided to the electric motor.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a mine haul vehicle may be used as an example of a mobile platform supporting a system incorporating an embodiment of the invention.

Before further discussion of the cooling arrangement for an electric motor of a battery electric vehicle, an example platform in which the electric motor is installed is presented. FIGS. 1 and 2 show an embodiment of an off-highway, load-haul-dump vehicle 100. The load-haul-dump vehicle may be referred to herein as a battery electric vehicle. FIG. 1 is a perspective view of the load-haul-dump vehicle and FIG. 2 is a top view of the load-haul-dump vehicle. FIGS. 1-2 include an axis system 101 including a horizontal axis 109, vertical axis 105, and lateral axis 107. Such a vehicle may be utilized for underground mining and utilizes electric motor propulsion without an additional engine (e.g., such as a gas-fueled or diesel-fueled engine). The load-haul-dump vehicle includes a front chassis (e.g., vehicle frame) 102 and a rear chassis 104. The front chassis and rear chassis form a structural frame of the load-haul-dump vehicle and have additional vehicle components coupled thereto. As explained further below, the front or rear chassis may include a structural frame and additional components coupled within and to the structural frame. The front chassis and rear chassis are coupled to one another via a vehicle articulation joint 106. The articulation joint allows the front chassis and rear chassis to move (e.g., turn or rotate) relative to one another. As shown in FIG. 1, the articulation joint includes two coupling points between the front chassis and rear chassis (e.g., one near a top of the vehicle and one near a bottom of the vehicle. The articulation joint includes a flanged portion 108 on the front chassis (front chassis portion of the articulation joint) that comprises two double-stacked flanged portions and a connection point portion 110 on the rear chassis (rear chassis portion of the articulation joint) that comprises two connection points, where each connection point of the connection point portion couples to one of the two double-stacked flanged portions of the flanged portion via a pin. As such, the front chassis and rear chassis may pivot relative to one another, around a pivot axis formed by the connection of the flanged portion and connection point portion of the articulation joint.

An operator cab 112 is coupled to the rear chassis. As shown in FIGS. 1-2, the operator cab is positioned at one side of the rear chassis (e.g., offset from a centerline of the vehicle). A battery tray 114 comprising one or more batteries for powering the vehicle is also coupled to the rear chassis (e.g., directly coupled to the rear chassis). For example, the batteries of the battery tray may power one or more traction motors of the vehicle.

A work member 116 is coupled to the structural frame 103 of the front chassis. The work member may be a device configured for carrying out a work task of the vehicle. In one example, as shown in FIGS. 1-2, the work member is a bucket. However, in alternate embodiments, the work member may be any one of a scoop, bucket, platform lift, fork lift, drill, backhoe/hoe, shield hauler, or the like. Each of these work members may be disposed at a front end of the vehicle.

Specifically, arms 118 directly couple the work member to the structural frame of the front chassis. In one example, the arms 118 may be bucket arms. Additionally, a hydraulic cylinder 120 is coupled between the structural frame of the front chassis and the work member for adjusting a position of the work member (e.g., bucket, in this embodiment).

The front chassis further comprises an electric traction motor (not seen in FIGS. 1-2 since it is an interior component) positioned between sidewalls of the structural frame of the front chassis, below the hydraulic cylinder, in an area denoted by arrow 122 in FIG. 2. A gear box (also not visible in FIGS. 1-2 since it is an interior component) is coupled to electric traction motor and within the sidewalls of the structural frame of the front chassis. An area of the gear box is denoted by arrow 124 in FIG. 2.

Though the embodiments described herein may be in relation to positioning of the electric motor within the structural frame of the front chassis, in alternate embodiments, the electric traction motor may be instead positioned between sidewalls of the rear chassis in a similar fashion. Thus, the embodiments described herein for positioning an electric motor within a structural frame of a chassis may be implemented in either or both of the front chassis and rear chassis. In yet another embodiment, the electric traction motor may not couple to a gear box.

Returning to FIGS. 1-2, the vehicle further comprises front drive wheels 126 coupled to the structural frame of the front chassis via a front axle 130 and rear wheels 128 coupled to the structural frame of the rear chassis via a rear axle 132. The electric traction motor drives (e.g., provides motive power to) the front drive wheels. The electric traction motor is powered by the batteries of the battery tray. In one example, a flexible rear drive shaft may connect the rear axle to a rear output shaft on the gear box. A front drive shaft simultaneously connects the front axle to a front output shaft of the gear box. In this way, all wheels of the vehicle may be driven by the electric traction motor. As another example, the rear wheels may not be driven wheels of the vehicle. The vehicle shown in FIGS. 1-2 may include only one traction motor and the wheels of the vehicle may be driven only by the one (e.g., single) traction motor and no additional motor or engine source. For example, the vehicle shown in FIGS. 1-2 does not include an engine (such as a gas or diesel engine) and is entirely driven by an electric motor operating via battery power. In another example, the vehicle shown in FIGS. 1-2 may include more than one traction motor which provides drive power to the wheels, but still does not include an additional engine.

FIGS. 3-4 show an embodiment of an electric motor 300 which may be the electric traction motor used in the load-haul-dump vehicle of FIGS. 1-2. For example, the electric motor shown in FIGS. 3-4 may be positioned within one or more of the front chassis and rear chassis of the load-haul-dump vehicle and used to propel the front and rear wheels of the vehicle. FIG. 3 is a perspective view of the electric motor and FIG. 4 is a top view of the electric motor. FIGS. 3 and 4 both include the axis system 101 shown in FIGS. 1 and 2.

As shown in FIGS. 3-4, the electric motor is rectangular with exterior sidewalls. Specifically, the electric motor includes four exterior sidewalls forming an outer frame 302 of the electric motor and surrounding a stator core of the electric motor. The four exterior sidewalls includes a first sidewall 306, a second sidewall 310, a third (top) sidewall 304, and a fourth (bottom) sidewall 308. As shown in FIGS. 3-4, the four exterior sidewalls forming the outer frame are planar sidewalls. The first sidewall and second sidewall are parallel to one another and are perpendicular to each of the third and fourth sidewalls, where the third and fourth sidewalls are parallel to one another. Additionally, a line normal to the first sidewall and second sidewall is perpendicular to a rotational axis 322 of the electric motor.

The four exterior sidewalls form cooling surfaces (e.g., surfaces through which heat may be transferred away from internal components of the electric motor) of the electric motor. Specifically, heat generated from internal components of the electric motor (such as the stator, rotor, or the like) which are encased by the exterior sidewalls, may be transferred to the external sidewalls. Heat transfer means (such as passive or active conduction or convection heat transfer systems) may then be used to transfer heat away from the external sidewalls, thereby cooling the electric motor.

Figure 5:
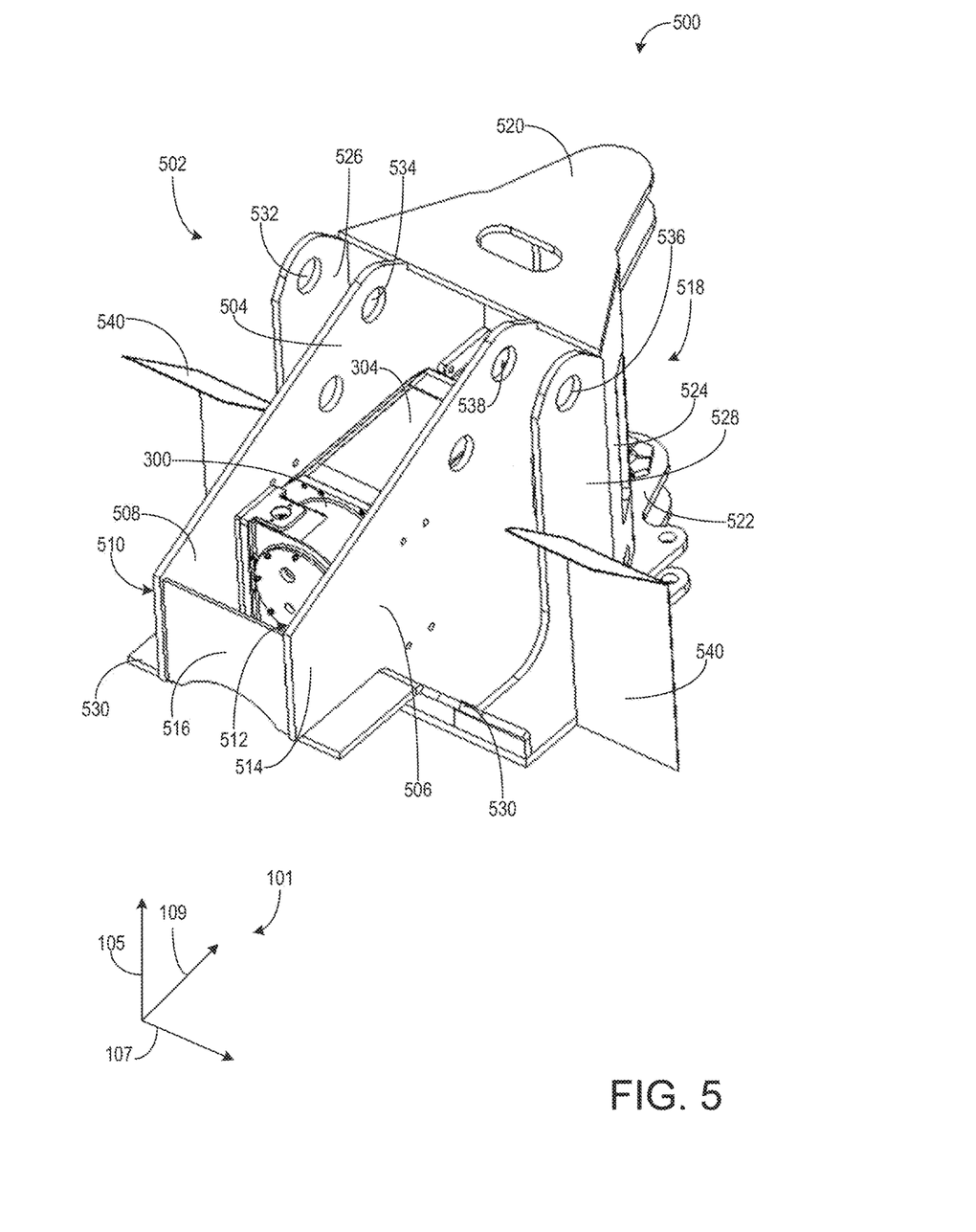
FIG. 5 shows the electric motor positioned within a structural frame of a chassis of a battery electric vehicle according to an embodiment of the invention.
Figure 6:
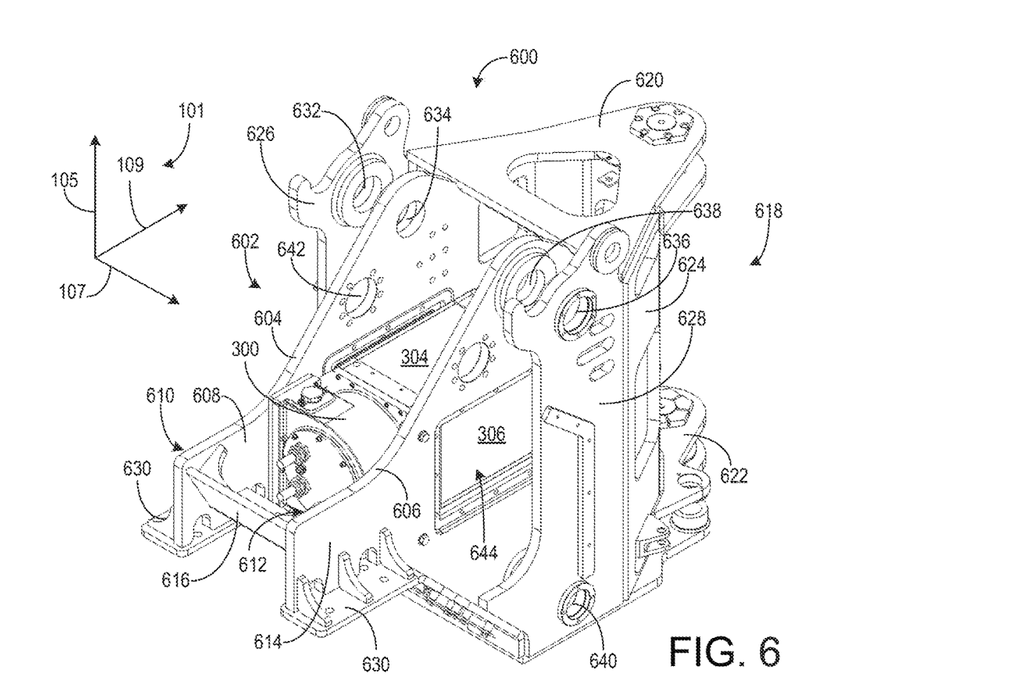
FIG. 6 shows a first assembled view of the electric motor positioned within a structural frame, between window cut-outs of the structural frame, of the chassis of a battery electric vehicle according to an embodiment of the invention.
Figure 7:
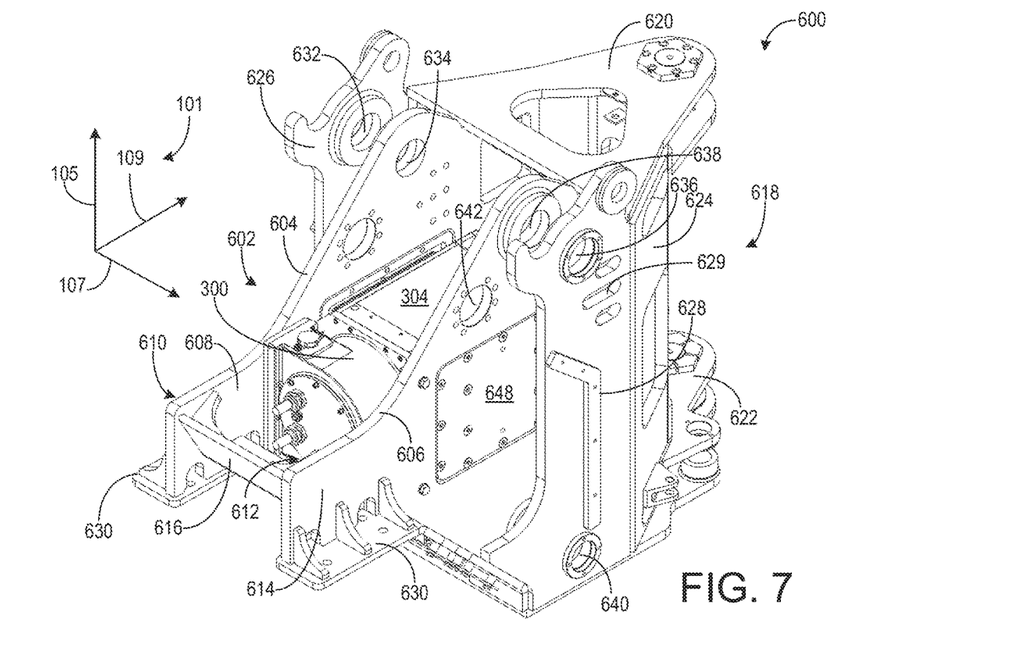
FIG. 7 shows a second assembled view of the electric motor positioned within the structural frame of the chassis of a battery electric vehicle, where the structural frame includes window cut-outs covered by chassis plates, according to an embodiment of the invention.

The electric motor further includes a motor non-drive end 312 and a motor drive end 314, where the motor non-drive end and motor drive end are positioned on opposite sides of the outer frame. An end of the motor drive end 314 may be referred to herein as a fifth side of the electric motor and the motor non-drive end may be referred to herein as a sixth side of the electric motor, where the fifth and sixth sides are parallel to one another and perpendicular to the first and second sides of the electric motor. The motor non-drive end, in one example, is a connection end that includes various coupling surfaces for coupling to additional components, such as components of the front chassis shown in FIGS. 1-2. As one example, the motor non-drive end includes mounting feet 316 which are configured to mount to sidewalls of a chassis, such as the structural frame 103 of the front chassis 102 shown in FIGS. 1-2 (and as shown in FIGS. 5-7, as described further below). The motor drive end includes an output shaft 318. The output shaft is a rotatable shaft that drives a component coupled thereto. As one example, the output shaft of the electric motor is configured to couple to a gear box which provides drive force to drive wheels of a vehicle in which the electric motor is installed (e.g., to front axle 130 and/or rear axle 132 and wheels 126 and or wheels 128 of the vehicle 100 shown in FIGS. 1-2). In this way, the electric motor may be drivingly coupled to a gear box. Additionally, the electric motor includes additional fixing elements (e.g., bolts) 320 which may be adapted to directly couple the electric motor to the gear box.

FIGS. 5-11 show various embodiments of the electric motor 300 positioned within and coupled to a structural frame of a chassis of a vehicle (such as structural frame 103 of front chassis 102 or rear chassis 104 of vehicle 100 shown in FIGS. 1-2). The vehicle may be a battery electric vehicle (in one example, the load-haul-dump vehicle 100 shown in FIGS. 1-2) where the motor drives propulsion of the vehicle. FIG. 5 shows a first embodiment of a chassis for a battery electric vehicle including a structural frame and the electric motor positioned within the structural frame. FIGS. 6-9 show a second embodiment of a chassis for a battery electric vehicle including a structural frame and the electric motor positioned within the structural frame. FIGS. 10-11 show the second embodiment of the chassis shown in FIGS. 6-9, with an additional liquid-cooled chill plate coupled to one of the external sidewalls of the electric motor. Components of the electric motor 300 described above with reference to FIGS. 3-4 are numbered similarly in FIGS. 5-11 and may not be re-described below in the interest of brevity. Additionally, similar components between FIGS. 5-11 may be numbered similarly and may not be described below in reference to each individual figure.

Turning first to FIG. 5, the chassis 500 includes the structural frame 502. The structural frame includes two parallel sidewalls, which include a first parallel sidewall 504 and a second parallel sidewall 506. The first parallel sidewall and second parallel sidewall are parallel to one another and spaced apart from one another. The electric motor 300 is positioned within the space that separates the first parallel sidewall and the second parallel sidewall from one another. The first parallel sidewall includes an inner surface 508 and an outer surface 510 and the second parallel sidewall includes an inner surface 512 and an outer surface 514. The second sidewall 310 (seen in FIGS. 3-4) of the electric motor is in face-sharing contact with the inner surface of the first parallel sidewall and the first sidewall 306 (seen in FIGS. 3-4) of the electric motor is in face-sharing contact with the inner surface of the second parallel sidewall. As a result, the electric motor is sandwiched between the first parallel sidewall and the second parallel sidewall of the structural frame. In one example, an entire surface of each of the first and second sidewalls of the electric motor are in face-sharing contact with one of the inner surfaces of the first and second parallel sidewalls of the structural frame. In this way, the electric motor is contacting (e.g., in direct thermal contact with) the structural frame of the chassis on at least two sides of the electric motor. This may provide increased surface area for transferring heat away from the motor and to the structural frame of the chassis.

A front, third sidewall 516 of the structural frame connects the first parallel sidewall and second parallel sidewall to one another at a front end of the chassis. When installed in a battery electric vehicle, such as the load-haul-dump vehicle of FIGS. 1-2, the front end of the chassis is proximate to a work member of the vehicle (such as work member 116 shown as a bucket in FIGS. 1-2). The structural frame further includes a flanged portion 518 of a vehicle articulation joint (such as the flanged portion 108 of articulation joint 106 shown in FIGS. 1-2). The flanged portion includes an upper, first double-stacked flange 520 and a lower, second double-stacked flange 522 which are coupled to one another via a vertical connecting wall portion 524 of the flanged portion of the vehicle articulation joint. The first and second flanges are adapted to couple to connection point portions of the articulation joint which are part of a structural frame of a rear chassis of the battery electric vehicle. The articulation joint allows the front chassis to pivot back and forth but constrains movement relative to the rear chassis in directions of the vertical and horizontal axes.

The structural frame further includes a fourth wall 526 and fifth wall 528. The fourth wall and fifth wall are each spaced away from the outer surface of the first parallel sidewall and outer surface of the second parallel sidewall, respectively. Each of the fourth and fifth walls are similar in length, in a direction of the vertical axis, to the first and second parallel sidewalls proximate to the flanged portion of the vehicle articulation joint. However, the fourth and fifth walls are narrower, in a direction of the horizontal axis, than the first and second parallel sidewalls and do not extend all the way to a front end of the chassis (e.g., proximate to the third sidewall of the structural frame). Each of the fourth and fifth walls are coupled to the flanged portion, the vertical connecting wall portion, and one of two ledges 530 that also couple to a corresponding one of the first and second parallel sidewalls. The ledges extend and angle along a bottom surface of the outer surfaces of the first and second parallel sidewalls, from the front, third sidewall, to one of the fourth and fifth walls. The space that separates the fourth wall and the first parallel sidewall is adapted to accommodate a work member arm of a work member of the vehicle (such as one of arms 118 shown in FIGS. 1-2). As such, a first work member arm is adapted to fit within the space between the fourth wall and the first parallel sidewall and pivotally couple to a first aperture 532 in the fourth wall and a second aperture 534 in the first parallel sidewall. Similarly, a second work member arm is adapted to fit within the space between the fifth wall and the second parallel sidewall and pivotally couple to a third aperture 536 in the fifth wall and a fourth aperture 538 in the second parallel sidewall. The work member (e.g., bucket) arms may move within the walls (and rotate about a pivot axis defined at the aperture) in order to move a work member (e.g., bucket) coupled to both of the work member arms.

A top of the first and second parallel sidewalls are each angled downward, in a direction of the vertical axis, from the flanged portion to the third sidewall at the front end of the chassis. As such, the first and second sidewalls have a longer length, in a direction of the vertical axis, at a rear end of the chassis, proximate to the flanged portion 518 than at the front end of the chassis, proximate to the third sidewall. This angling provides room for the work member arms and work member (e.g., bucket) to move vertically up and down with the chassis is coupled within a battery electric vehicle.

Additionally, a bottom of the first and second parallel sidewalls, opposite the bottom, are angled upward, in a direction of the vertical axis, from the fourth and fifth walls of the structural frame to a position closer to the third sidewall at the front end of the chassis. For example, each ledge has an angled and flat portion that follow a shape of the bottom side of the first and second parallel sidewalls. This shape results in a narrower front end of the structural frame which accommodates a front axle of the vehicle of the chassis. For example, the ledges at the front end of the structural frame may be adapted to provide a space for the front axle of the vehicle. In some examples, the front axle may couple to the front, bottom surface of the structural frame formed by the ledges and bottom of the third sidewall.

As shown in FIG. 5, the structural frame further includes fenders 540 which are adapted to be positioned around and/or above front wheels coupled to the front axle. As such, front wheels of the vehicle may be positioned below the fenders and on either side of the structural frame.

Figure 8:
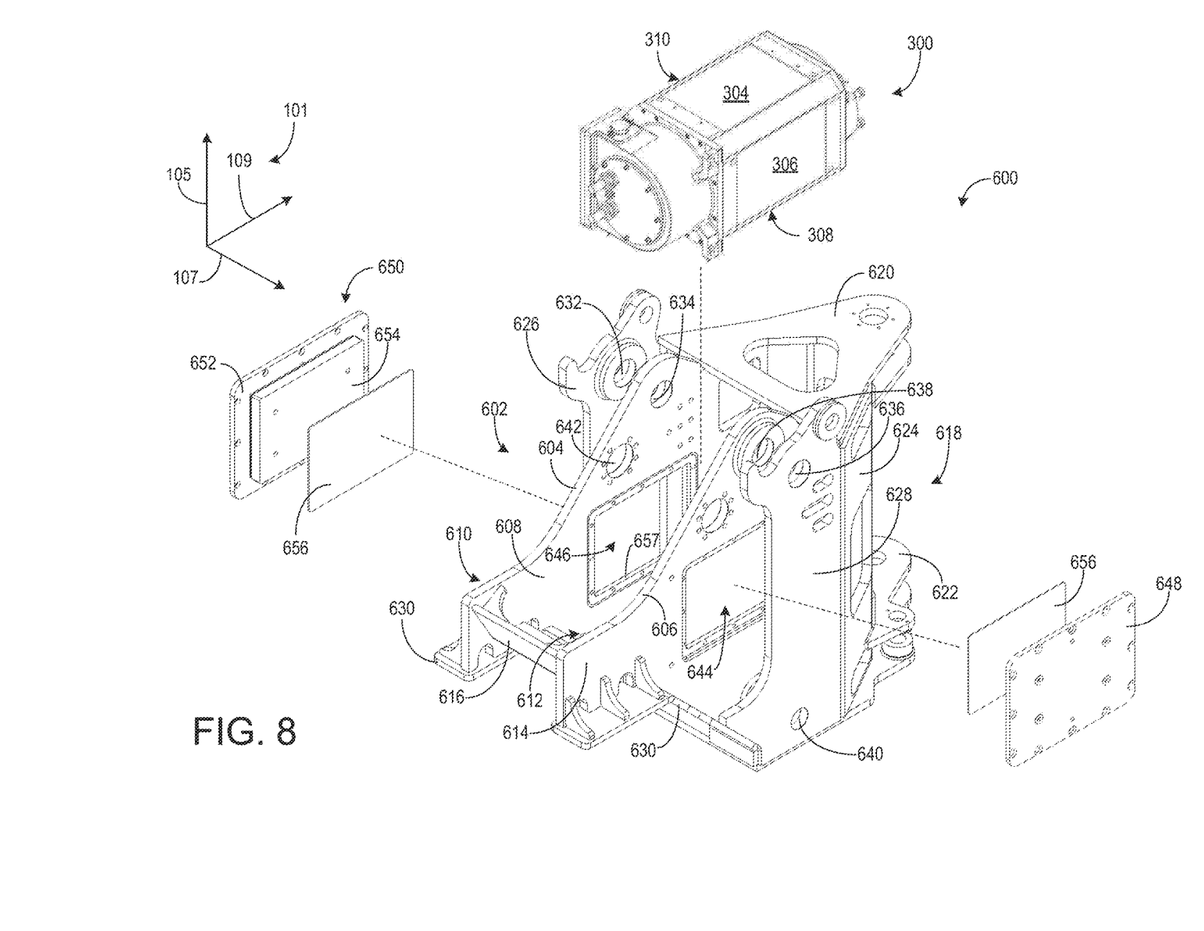
FIG. 8 shows an exploded view of the electric motor and structural frame including window cut-outs covered by chassis plates according to an embodiment of the invention.
Figure 9:
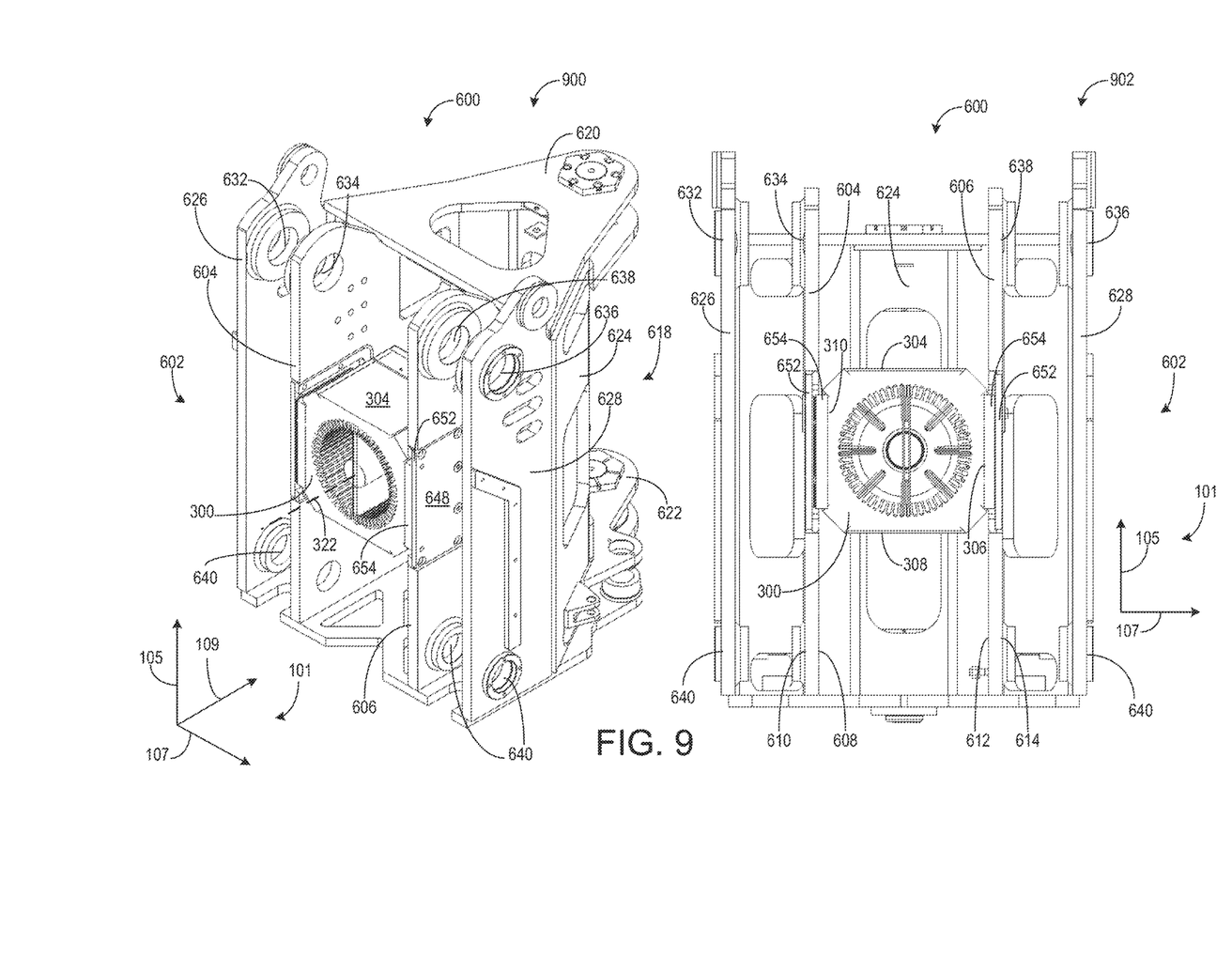
FIG. 9 shows a section view of the electric motor positioned within the structural frame of a chassis of a battery electric vehicle, where the structural frame includes window cut-outs covered by chassis plates, according to an embodiment of the invention.

Turning to FIGS. 6-9, a second embodiment of a chassis 600 for a battery electric vehicle including a structural frame 602 and the electric motor 300 positioned within the structural frame is shown. FIGS. 6-7 show an assembled view of the electric motor positioned within the structural frame. FIG. 8 shows an exploded view of the electric motor positioned within the structural frame. FIG. 9 shows different views (e.g., isometric and front) of a section view of the electric motor positioned within the structural frame.

Similar to the chassis of FIG. 5, the structural frame shown in FIGS. 6-9 includes two parallel sidewalls, which include a first parallel sidewall 604 and a second parallel sidewall 606. The first parallel sidewall and second parallel sidewall are parallel to one another and spaced apart from one another. The electric motor 300 is positioned within the space that separates the first parallel sidewall and the second parallel sidewall from one another. The first parallel sidewall includes an inner surface 608 and an outer surface 610 and the second parallel sidewall includes an inner surface 612 and an outer surface 614. The second sidewall 310 of the electric motor is in face-sharing contact with the inner surface of the first parallel sidewall and the second parallel sidewall 306 of the electric motor is in face-sharing contact with the inner surface of the second parallel sidewall. As a result, the electric motor is sandwiched between the first parallel sidewall and the second parallel sidewall of the structural frame. In one example, an entire surface of each of the first and second sidewalls of the electric motor are in face-sharing contact with one of the inner surfaces of the first and second parallel sidewalls of the structural frame. In this way, the electric motor is contacting (e.g., in direct thermal contact with) the structural frame of the chassis on at least two sides of the electric motor. As described above, this provides increased surface area for transferring heat away from the motor and to the structural frame of the chassis.

The structural frame further includes a front, third sidewall 616 which is angled and connects the first parallel sidewall and second parallel sidewall to one another at a front end of the chassis. The structural frame further includes a flanged portion 618 of a vehicle articulation joint (such as the flanged portion 108 of articulation joint 106 shown in FIGS. 1-2). The flanged portion includes an upper, first double-stacked flange 620 and a lower, second double-stacked flange 622 which are coupled to one another via a vertical connecting wall portion 624 of the flanged portion of the vehicle articulation joint. The first and second flanges are adapted to couple to connection point portions of the articulation joint which are part of a structural frame of a rear chassis of the battery electric vehicle.

The structural frame further includes a fourth wall 626 and fifth wall 628. The fourth wall and fifth wall are each spaced away from the outer surface of the first parallel sidewall and outer surface of the second parallel sidewall, respectively. Each of the fourth and fifth walls are coupled to the flanged portion, the vertical connecting wall portion, and one of two ledges 630 that also couple to a corresponding one of the first and second parallel sidewalls along a length of each ledge. The ledges extend and angle along a bottom surface of the outer surfaces of the first and second parallel sidewalls, from the front, third sidewall, to one of the fourth and fifth walls of the structural frame. Each of the ledges includes a flat portion, proximate to the third wall and arranged perpendicular to the first and second parallel sidewalls, and an angled portion which angles downward from the corresponding flat portion to a bottom side of either the fourth or fifth wall. As shown in FIGS. 6-8, the ledges may include one or more apertures and smaller support flanges coupling the flat portion to one of the outer surfaces of the first and second parallel sidewalls. The fourth and fifth walls include one or more apertures and/or vents 629, as described further below.

Similarly to the description above with reference to FIG. 5, the space that separates the fourth wall and the first parallel sidewall is adapted to accommodate a work member arm of a work member of the vehicle (such as one of work member arms 118 shown in FIGS. 1-2). As such, a first work member arm is adapted to fit within the space between the fourth wall and the first parallel sidewall and pivotally couple to a first aperture 632 in the fourth wall and a second aperture 634 in the first parallel sidewall. Similarly, a second work member arm is adapted to fit within the space between the fifth wall and the second parallel sidewall and pivotally coupled to a third aperture 636 in the fifth wall and a fourth aperture 638 in the second parallel sidewall. The work member arms may move within the walls (and rotate about a pivot axis defined at the aperture) in order to move a work member coupled to both of the work member arms. As shown in FIGS. 6-9, the first and second parallel sidewalls and fourth and fifth walls of the structural frame may include additionally aligned apertures 640 adapted to couple to hydraulic lift cylinders of the work member arms (e.g., work member arms 118 shown in FIGS. 1-2) of the vehicle. As seen in FIG. 6-8, the first and second parallel sidewalls may also each include an aperture 642 positioned above a window cut-out (e.g., opening) which are adapted (e.g., shaped) to provide a pivot point for the hydraulic cylinders (e.g., such as hydraulic cylinder 120) coupled to the work member.

The first parallel sidewall includes a first window cut-out (e.g., opening) 646 and the second parallel sidewall includes a second window cut-out 644 (as seen in FIG. 8). As shown in FIGS. 6-8, each window cut-out is a rectangular opening positioned in a middle portion of one of the parallel sidewalls, at a location of one of the first and second exterior sidewalls of the electric motor. Specifically, as shown in FIG. 6, the window cut-out in the second parallel sidewall exposes the first sidewall 306 of the electric motor. In one example, a size of the window cut-out may be approximately the same size as the first and second sidewalls of the electric motor. For example, the window-cut out may extend along a length and width of one of the first and second sidewalls of the electric motor. In this way, the electric motor is coupled between the first and second window cut-outs within the structural frame. The size of the window cut-outs may allow for a majority of the sidewalls of the electric motor to be in direct thermal contact with the plates 648 and 650, as described further below, in order to increase heat transfer from the motor.

A first plate 648 is removably coupled to the second window cut-out and a second plate 650 is removably coupled to the first window cut-out. Each of the plates includes an outer mounting flange wider than the window cut-outs and a stepped portion adapted to mate with an inner edge (where the inner edge has a thickness) of the window cut-outs. For example, as seen in FIG. 8, an inner surface of the plate 650 includes an outer mounting flange 652 and a stepped portion 654 that is raised from the outer mounting flange. The outer edge of the stepped portion mates with the inner edge 657 of the window cut-out all the way around a perimeter of the window cut-out. This arrangement allows the plate to fit snugly within the window cut-out and provide a good heat transfer path from the plates to the parallel sidewalls of the structural frame. The outer mounting flange of each of the first and second plates removably couples with the outer surface of one of the first and second parallel sidewalls of the structural frame. When the plate is coupled to a corresponding one of the window cut-outs, an inner surface of the stepped portion of the plate is positioned against one of the first and second sidewalls of the electric motor (e.g., in face-sharing contact, in one example). In this way, the combination of the window cut-outs and removable plate that are adapted to mate with each window cut-out provides a means of easily inserting a thermal filler element between the motor sidewalls and plates (as described further below) during installation of the motor within the structural frame, thereby increasing the ease of motor insertion/removal and ensuring increased thermal contact between the sidewalls of the electric motor and the sidewalls of the structural frame.

As seen in FIG. 8, a thermal filler element (e.g., thermal interface) 656 is positioned between each of the first and second sidewalls of the electric motor and the plate of one of the first and second parallel sidewalls of the structural frame. For example, the thermal filter element may be sandwiched between the inner surface of the stepped portion 654 and the outer surface of one of the first and second sidewalls of the electric motor. The thermal filter element may increase heat transfer away from the walls of the electric motor and to the structural frame. For example, heat may pass from the first and second sidewalls of the electric motor, to the thermal filter element, to the plates, and then to the rest of the structural frame which may carry heat outward and away from the electric motor. The thermal filler element may include one or more of a metal shim, silicone foam, silicone rubber, thermal paste, thermal grease, thermal epoxy, steel-silicone foam, or the like. In one example, the thermal filler element may be a conductive silicone foam of a threshold thickness (in one example, approximately ¼ inch). FIG. 9 shows an isometric view 900 and a front view 902 of the electric motor sandwiched between the two plates coupled to the first and second parallel sidewalls of the structural frame.

The first and second parallel sidewalls are angled as described above with reference to FIG. 5 to accommodate work member arms, a work member (such as a bucket), and front axle of the vehicle.

As seen in FIGS. 6-7 and 9, the top, third sidewall 304 and bottom, fourth sidewall 308 of the electric motor are exposed to air and are not in face-sharing contact with the structural frame of the chassis or an additional cooling element. However, in some embodiments, as shown in FIGS. 10-11, one or more of the third and fourth sidewalls of the electric motor may have an additional cooling element coupled thereto.

FIGS. 10-11 show the electric motor 300 coupled within the chassis 600. FIG. 10 shows an isometric view and FIG. 11 shows a first isometric section view 1100 and a second front section view 1102. FIG. 10 is similar to FIG. 7 and FIG. 11 is similar to FIG. 9, however in FIGS. 10 and 11, a first liquid-cooled chill plate 1002 is coupled to the top, third sidewall 304 of the electric motor and a second liquid-cooled chill plate 1004 is coupled to the bottom, fourth sidewall 308 of the electric motor. More specifically, a surface of each of the liquid-cooled chill plates is in face-sharing contact with the surface of one of the third and fourth sidewalls of the electric motor. The liquid-cooled chill plates may be coupled to a coolant system positioned within the structural frame. In one embodiment, the coolant medium in the coolant system coupled to and running through the liquid-cooled chill plates is hydraulic oil that is common throughout the vehicle hydraulic system, and is itself cooled by the vehicle's existing hydraulic oil heat exchanger, thereby avoiding the need for any additional or dedicated liquid cooling system. In alternative embodiments, the coolant medium in the coolant system coupled to and running through the liquid-cooled chill plates may be a water-glycol coolant medium. In this embodiment, the coolant system may include an additional dedicated heat exchanger and coolant pump.

The liquid-cooled chill plates may further enhance cooling of the electric motor. In this way, the electric motor may not only be cooled via conduction via face-sharing contact of two sides of the motor with the structural frame of the chassis, but also conduction via face-sharing contact of an alternate two sides of the motor with the liquid-cooled chill plates. In alternate embodiments, only one of the third sidewall and fourth sidewall of the electric motor may be in face-sharing contact with a liquid-cooled chill plate (such that the system only includes one liquid-cooled chill plate) and the other of the third and fourth sidewall may be open to the surrounding air/environment.

FIGS. 1-11 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, an electric motor (such as an electric traction motor) used for vehicle propulsion may be arranged between and in face-sharing contact with two parallel sidewalls of a structural frame of the chassis. By arranging the electric motor between and in face-sharing contact with the structural frame, the motor sidewalls are in direct thermal contact with sidewalls of the structural frame and thus conductive heat transfer occurs between at least two sidewalls of the motor and the structural frame. As a result, a technical effect of enhanced motor cooling without requiring large cooling systems, cooling elements that may become packed with debris (e.g., fins), and/or larger motor or chassis components, is achieved. For example, a packaging size of the traction motor may remain smaller due to utilizing the chassis structural frame sidewalls for conductive cooling instead of relying on convective cooling alone or alternate cooling methods that may require more system components, thereby increasing cooling control complexity and/or vehicle size. In another embodiment, a different type of motor, such as an auxiliary electric motor for powering a hydraulic pump, may be similarly mounted and cooled via a structural frame of a vehicle.

Additionally, the issues noted herein have been recognized by the inventor(s) herein and are not admitted to be known, including the issues identified in the DISCUSSION OF ART.

As one embodiment, a chassis for a battery electric vehicle comprises: a structural frame including two parallel sidewalls and a first portion of a vehicle articulation joint; and an electric motor coupled between and in face-sharing contact with each of the two parallel sidewalls. In one example, an entirety of a first side of the electric motor is contacting a first sidewall of the two parallel sidewalls and an entirety of a second side of the electric motor is contacting a second sidewall of the two parallel sidewalls, where the first side is parallel to the second side. In another example, the chassis may further comprise a thermal interface positioned between the first side of the electric motor and the first sidewall of the structural frame and between the second side of the electric motor and the second sidewall of the structural frame. For example, the thermal interface may include one or more of a metal shim, silicone foam, silicone rubber, thermal paste, thermal grease, thermal epoxy, and steel-silicone foam. In yet another example, each of the first sidewall and second sidewall of the structural frame includes a respective window cut-out and a plate removably coupled to the window cut-out. Further, the electric motor may further include a third side and fourth side, each parallel to one another and perpendicular to the first side and second side, and further comprising at least one liquid-cooled chill plate coupled to and in face-sharing contact with one of the third side and fourth side. The electric motor may also include a fifth side and sixth side, each parallel to one another and perpendicular to the first side and second side, where the fifth side includes an output shaft coupleable to a gear box arranged within the structural frame. In another example, a line normal to the first side and second side of the electric motor is perpendicular to a rotational axis of the electric motor. In a first example, the chassis is a front chassis, where the first portion is a flanged portion of the vehicle articulation joint and is coupled to each of the two parallel sidewalls, and where the two parallel sidewalls each include a respective aperture forming at least a portion of a pivot point for a work member arm of the battery electric vehicle. In a second example, the chassis is a rear chassis and the first portion is a connection point portion of the vehicle articulation joint. In another example, the chassis may further comprise a tire fender coupled to each of the two parallel sidewalls of the structural frame.

As another embodiment, a front chassis for a battery electric vehicle comprises: a structural frame including a first parallel sidewall and a second parallel sidewall and a first portion of an articulation joint, where each of the first parallel sidewall and second parallel sidewall includes a respective opening and a plate removably coupled to the opening; and an electric motor coupled between and contacting each of the first parallel sidewall and second parallel sidewall, where a third parallel sidewall and fourth parallel sidewall of the electric motor are each in face-sharing contact with the plate of one of the first parallel sidewall and second parallel sidewall of the structural frame. In one example, the front chassis may further comprise a thermal filler element positioned between each of the third parallel sidewall and fourth parallel sidewall of the electric motor and the plate of one of the first parallel sidewall and second parallel sidewall of the structural frame. Additionally, in one example, the plate includes an outer mounting flange wider than the opening and removably coupled to an exterior surface of one of the first parallel sidewall and second parallel sidewall and a stepped portion adapted to mate with an inner edge of the opening, around a perimeter of the opening. In another example, the first portion of the articulation joint is coupled to a first end of the structural frame and each of the first parallel sidewall and second parallel sidewall and the structural frame further includes an angled, bottom surface arranged at a second end of the structural frame, opposite the first end, where the bottom surface is coupleable to an axle of the battery electric vehicle. In yet another example, the front chassis may further comprise a gear box coupled to the electric motor via an output drive shaft of the electric motor and positioned within the structural frame.

As yet another embodiment, a battery electric vehicle comprises a front chassis including a structural frame, an electric traction motor coupled between and in face-sharing contact with two parallel sidewalls of the structural frame, and a first portion of an articulation joint; a rear chassis including a second portion of the articulation joint, the rear chassis pivotally coupled to the front chassis via the first portion and second portion of the articulation joint, the articulation joint formed by the first portion and the second portion; a battery tray coupled to the rear chassis; and a work member including arms coupled to the structural frame. In one example, the battery electric vehicle may further comprise a gear box coupled to the electric traction motor via an output shaft of the electric traction motor. In another example, the battery electric vehicle may further comprise an axle coupling wheels of the battery electric vehicle to the structural frame, where the axle is arranged perpendicular to the output shaft. In yet another example, the wheels of the battery electric vehicle are configured to be driven by the electric traction motor alone.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A chassis for a battery electric vehicle, comprising:
   a structural frame including first and second parallel sidewalls and a first portion of a vehicle articulation joint;
   an electric motor having a first side and a second side, where the first side is parallel to the second side, and the motor is coupled between the first and second parallel sidewalls of the structural frame; and
   a thermal interface positioned between the first side of the electric motor and the first sidewall of the structural frame and between the second side of the electric motor and the second sidewall of the structural frame;
   wherein an entirety of the first side of the electric motor is in face-sharing contact with the thermal interface positioned between the first side of the electric motor and the first sidewall of the structural frame and an entirety of the second side of the electric motor is in face-sharing contact with the thermal interface positioned between the second side of the electric motor and the second sidewall of the structural frame, and wherein each of the first sidewall and second sidewall of the structural frame includes a respective window cut-out and a plate removably coupled to the window cut-out.

2. The chassis of claim 1, wherein the thermal interface includes one or more of a metal shim, silicone foam, silicone rubber, thermal paste, thermal grease, thermal epoxy, or steel-silicone foam.

3. A chassis for a battery electric vehicle, comprising:
   a structural frame including two parallel sidewalls and a first portion of a vehicle articulation joint;
   an electric motor coupled between and in face-sharing contact with each of the two parallel sidewalls, wherein an entirety of a first side of the electric motor is contacting a first sidewall of the two parallel sidewalls and an entirety of a second side of the electric motor is contacting a second sidewall of the two parallel sidewalls, where the first side is parallel to the second side, and
   wherein each of the first sidewall and second sidewall of the structural frame includes a respective window cut-out and a plate removably coupled to the window cut-out.

4. The chassis of claim 3, wherein the electric motor includes a third side and fourth side, each parallel to one another and perpendicular to the first side and second side, and further comprising at least one liquid-cooled chill plate coupled to and in face-sharing contact with one of the third side or fourth side.

5. The chassis of claim 3, wherein the electric motor includes a fifth side and sixth side, each parallel to one another and perpendicular to the first side and second side, wherein the fifth side includes an output shaft coupleable to a gear box arranged within the structural frame.

6. The chassis of claim 3, wherein a line normal to the first side and second side of the electric motor is perpendicular to a rotational axis of the electric motor.

7. The chassis of claim 3, wherein the chassis is a front chassis, wherein the first portion is a flanged portion of the vehicle articulation joint and is coupled to each of the two parallel sidewalls, and wherein the two parallel sidewalls each include a respective aperture forming at least a portion of a pivot point for a work member arm of the battery electric vehicle.

8. The chassis of claim 3, wherein the chassis is a rear chassis and the first portion is a connection point portion of the vehicle articulation joint.

9. The chassis of claim 3, further comprising a tire fender coupled to each of the two parallel sidewalls of the structural frame.

10. A front chassis for a battery electric vehicle, comprising:
a structural frame including a first parallel sidewall and a second parallel sidewall and a first portion of an articulation joint, where each of the first parallel sidewall and second parallel sidewall includes a respective opening and a plate removably coupled to the opening, wherein the first portion of the articulation joint is coupled to a first end of the structural frame and each of the first parallel sidewall and second parallel sidewall and wherein the structural frame further includes an angled, bottom surface arranged at a second end of the structural frame, opposite the first end, where the bottom surface is coupleable to an axle of the battery electric vehicle; and
an electric motor coupled between and contacting each of the first parallel sidewall and second parallel sidewall, where a third parallel sidewall and fourth parallel sidewall of the electric motor are each in face-sharing contact with the plate of one of the first parallel sidewall and second parallel sidewall of the structural frame.

11. The front chassis of claim 10, further comprising a thermal filler element positioned between each of the third parallel sidewall and fourth parallel sidewall of the electric motor and the plate of one of the first parallel sidewall and second parallel sidewall of the structural frame.

12. The front chassis of claim 10, wherein the plate includes an outer mounting flange wider than the opening and removably coupled to an exterior surface of one of the first parallel sidewall and second parallel sidewall and a stepped portion adapted to mate with an inner edge of the opening, around a perimeter of the opening.

13. The front chassis of claim 10, further comprising a gear box coupled to the electric motor via an output drive shaft of the electric motor and positioned within the structural frame.

14. A battery electric vehicle, comprising:
a front chassis including a structural frame, an electric traction motor coupled between and in face-sharing contact with two parallel sidewalls of the structural frame, and a first portion of an articulation joint;
a rear chassis including a second portion of the articulation joint, the rear chassis pivotally coupled to the front chassis via the first portion and second portion of the articulation joint, the articulation joint formed by the first portion and the second portion;
a battery tray coupled to the rear chassis, wherein the battery tray and the front chassis are coupled to opposing ends of the rear chassis; and
a work member coupled to the structural frame.

15. The battery electric vehicle of claim 14, further comprising a gear box coupled to the electric traction motor via an output shaft of the electric traction motor.

16. The battery electric vehicle of claim 15, further comprising an axle coupling wheels of the battery electric vehicle to the structural frame, where the axle is arranged perpendicular to the output shaft.

17. The battery electric vehicle of claim 16, wherein the wheels of the battery electric vehicle are configured to be driven by the electric traction motor alone.

18. The battery electric vehicle of claim 14, further comprising work member arms coupled to the structural frame, wherein the work member is attached to the work member arms and comprises a bucket.

19. The battery electric vehicle of claim 14, wherein the work member comprises one or more of a scoop, a platform lift, a fork lift, a drill, a hoe, or a shield hauler.

* * * * *